US008663720B2

(12) United States Patent
Fujita et al.

(10) Patent No.: US 8,663,720 B2
(45) Date of Patent: Mar. 4, 2014

(54) PROCESS FOR PREPARING FERMENTED TEA AND COMPOSITION

(75) Inventors: Hiroyuki Fujita, Osaka (JP); Tomohide Yamagami, Osaka (JP)

(73) Assignee: Nippon Supplement, Inc., Osaka-Fu (JP)

( * ) Notice: Subject to any disclaimer, the term of this patent is extended or adjusted under 35 U.S.C. 154(b) by 1487 days.

(21) Appl. No.: 11/084,937

(22) Filed: Mar. 11, 2005

(65) Prior Publication Data

US 2005/0202123 A1    Sep. 15, 2005

(30) Foreign Application Priority Data

Mar. 12, 2004  (JP) ................................ 2004-069998
May 28, 2004   (JP) ................................ 2004-159681

(51) Int. Cl.
*A23K 1/00* (2006.01)

(52) U.S. Cl.
USPC ............................................. 426/52; 426/597

(58) Field of Classification Search
USPC .................................................. 426/52, 597
See application file for complete search history.

(56) References Cited

U.S. PATENT DOCUMENTS

| 2,975,057 | A |  | 3/1961 | Seltzer et al. ..................... 99/77 |
| 4,051,264 | A |  | 9/1977 | Sanderson et al. .............. 426/52 |
| 6,299,925 | B1 | * | 10/2001 | Xiong et al. .................... 426/597 |
| 6,423,362 | B1 | * | 7/2002 | Lehmberg et al. ............ 426/597 |
| 2001/0048956 | A1 | * | 12/2001 | Blair et al. ...................... 426/49 |

FOREIGN PATENT DOCUMENTS

| CA | 2 152 388 | A1 |  | 7/1994 |
| CN | 1059451 | A |  | 3/1992 |
| CN | 1437872 | A |  | 8/2003 |
| EP | 0391468 |  |  | 10/1990 |
| EP | 0760213 | A1 |  | 3/1997 |
| EP | 1466530 | A1 |  | 10/2004 |
| GB | 1413351 |  |  | 11/1975 |
| JP | 2002-370994 |  |  | 12/2002 |
| WO | WO 02/088342 |  | * | 7/2002 ............... C12N 9/00 |

OTHER PUBLICATIONS

Schmidt, A. 1952. Evaluation of black teas. Zeitschrift fuer Lebensmittel-Untersuchung und Forschung. 95: 412-418 (Abstract).*

Angayarkanni, J. et al. 2002. Improvement of Tea Leaves Fermentation with *Aspergillus* spp. Pectinase. J. BioSci. Bioeng. 94 (4): 299-303.*
JP-06-141790—Machine Translation.*
Madamwar, D. et al. 1989. Solid state fermentation of cellulase and beta-glactosidase production by *Aspergillus niger*. J. Ferment. and Bioeng. 67:424-426—Abstract Only.*
Hwang, L. S. et al. 2003. Hypolipidemic effect and antiatherogenic potential of Pu-Erh tea. In Oriental Foods and Herbs. American Chemical Society Symposium Series. Washington D.C.*
JP-06-141790 (1994)—Machine Translation.*
Patent Abstracts of Japan, corresponding to Japanese Patent Publication No. 2002-370994, Publication Date Dec. 24, 2002, "Blood Sugar Value Elevation-Inhibiting Substance and Functional Beverage or Food Containing the Same", Yoshitaka et al.
"Effects of Pu-Erh Tea on Lipid Metabolism in Rats", Sano et al., 1986, Chem. Pharm Bull, 34, 1, pp. 221-228.
"Hypocholesterolemic Effects of Chinese Tea", Yang et al., Pharmocological Research, vol. 35, No. 6, 1997, pp. 505-512.
Database EPODOC, EPO, XP-002337051, Mar. 18, 1992, "Abstract".
"Microorganisms in Fermentation of Goishi-cha, Japanese Fermented Tea Leaves", Okada et al., Nippon Shokuhin Kagaku Kogaku Kaishi, Jnl. of Japanese Society of Food Science and Technology, vol. 43, No. 9, 1996, pp. 1019-1027.
Database EPODOC, EPO, XP-002337052, Mar. 20, 2003, "Abstract".
Food Style 21, vol. 6, No. 7; pp. 135-137; Jul. 2002; partial English translation provided.
Food Style 21, vol. 6, No. 4; pp. 106-110; Apr. 2002; partial English translation provided.
English translation-in-part of Prior Arts, CN1059451A, (Mar. 18, 1992).
English translation-in-part of Prior Arts, CN1437872A, (Aug. 27, 2003).

* cited by examiner

*Primary Examiner* — D. Lawrence Tarazano
*Assistant Examiner* — Hamid R Badr
(74) *Attorney, Agent, or Firm* — Ware, Fressola, Maguire & Barber LLP

(57) ABSTRACT

The present invention provides a process for preparing fermented tea, by which fermented tea is prepared over a short period of time, while maintaining the physiological activity thereof, and yield of the extract is improved, and a composition, which has favorable flavor and excellent stability and is useful as a functional food. Specifically, the present invention provides a process for preparing fermented tea comprising the step of fermenting tea leaves in the presence of tea leave stems and a composition containing fermented tea extract and dietary fiber.

8 Claims, No Drawings

PROCESS FOR PREPARING FERMENTED TEA AND COMPOSITION

BACKGROUND OF THE INVENTION

The present invention relates to a process for preparing fermented tea and a composition. Specifically, the present invention relates to a process for preparing fermented tea comprising the step of fermenting tea leaves in the presence of tea leave stems and a composition comprising fermented tea and dietary fiber.

In recent years, as our dietary habits become rich, adults having symptoms of hyperlipemia are increasing and as a result, diseases such as obesity, arteriosclerosis and thrombosis are caused. As a preventive therapeutic agent of such disease, functionality of teas is attracting attention. Hei-cha, which is one kind of Chinese tea, such as Puer-cha, has been reported to have lipid metabolism activity (Sano et al., 1986, Chem. Pharm. Bull (Tokyo), 34, 1, p 221-8) and temporary cholesterol lowering activity (Yang et al., Pharmacological research, Vol. 35, No. 6, 1997: 505-512). As specific foods paying attention to the physiological activity of hei-cha having the above activity, known are functional food materials and functional food and drink products, in which a blood glucose-increase inhibiting agent comprising extract of hei-cha is added (JP-A-2002-370994).

However, to prepare Chinese tea such as hei-cha, usually more than 40 days is necessary. In this way, hei-cha cannot be prepared in a short period of time, while maintaining the physiological activity of hei-cha such as cholesterol lowering activity, and yield of the extract from fermented tea cannot be improved.

Also, the functional food materials and functional food and drink products disclosed in JP-A-2002-370994 utilize hei-cha as a blood glucose-increase inhibiting agent. However, when applying hei-cha to foods, the food absorbs moisture in storage and as a result, bacteria grows, thereby causing putrefaction and degeneration. Furthermore, there are the problems that activity decreases and that ingestion is difficult, as there are strange taste such as bitterness and strange smell when ingesting orally.

SUMMARY OF THE INVENTION

In this way, development is desired of a process for preparing fermented tea, by which the time for preparing fermented tea is shortened, while maintaining physiological activity such as cholesterol lowering activity, and yield of the extract from fermented tea is improved, and a composition, which is excellent in the effect of preventing putrefaction and degeneration in storage due to bacteria and has excellent improvement in flavor.

As a result of intensive studies in light of the above, the present inventors have found that the time for preparing fermented tea can be shortened, while maintaining physiological activity such as cholesterol lowering activity and yield of the extract from fermented tea can be improved, by fermenting tea leaves in the presence of tea leave stems when preparing fermented tea; a composition containing fermented tea extract and dietary fiber is excellent in the effect of preventing putrefaction and degeneration in storage due to bacteria (stability of powder); and flavor can be improved. Thus, the present invention was achieved.

That is, the present invention relates to a process for preparing fermented tea comprising the step of fermenting tea leaves in the presence of tea leave stems.

An amount of the tea leave stems is preferably at least 5 parts by weight based on 100 parts by weight of the tea leaves.

Fermentation is preferably conducted in the presence of a microorganism and the microorganism is preferably of *Aspergillus* sp. or *Rhizopus* sp. Also, the amount of the microorganism is more preferably 0.001 to 1% by weight based on the total amount of the tea leaves and tea leave stems.

Fermentation is preferably conducted for at least 5 hours at a temperature of at least 32° C.

The present invention also relates to fermented tea obtained by the above process.

A content of caffeine in the fermented tea is preferably at most 7% by weight.

The present invention also relates to a composition containing fermented tea extract and dietary fiber.

The fermented tea is preferably fermented tea obtained by the above process.

The fermented tea extract is preferably obtained by extracting fermented tea by water or hot water.

The dietary fiber is preferably a polysaccharide.

An amount of the dietary fiber is preferably 5 to 500 parts by weight based on 100 parts by weight of the fermented tea extract.

The present invention also relates to a functional food containing the above composition.

DETAILED DESCRIPTION

The present invention relates to a process for preparing fermented tea comprising the step of fermenting tea leaves in the presence of tea leave stems.

Examples of the tea leaves used in the present invention are tea leaves obtained from tea plants such as the Chinese big leaf species, Chinese small leaf species, *Shan* species and *Assam* species.

In the present invention, heat treatment is preferably conducted before fermentation treatment, in order to prevent oxidization by enzymes in the tea leaves. According to this heat treatment, the raw smell of the tea leaves is lost and favorable scent can obtained. For heat treatment, tea leaves, which are obtained by directly subjecting harvested tea leaves to heat treatment, can be used and also, tea leaves, which are obtained by auto-lysing by enzymes in the tea leaves before heat treatment and then processed into semi-fermented tea such as Oolong tea or post-fermented tea such as black tea, can be used as the raw material. The heating method can be any method that thermally treats the tea leaves and deactivates the enzymes, such as direct firing using an iron pot, using various dryers utilizing electricity as the heat source and steam heating dryers utilizing steam and sun-drying by exposing in the sun. Heating is conducted under conditions of a temperature of 20° C. or higher, preferably at a high temperature of 100 to 200° C., for at least 10 seconds, preferably 30 to 3,000 seconds.

The process of the present invention is characterized in that tea leave stems are co-present when fermenting the tea leaves.

The size of the tea leaves and tea leave stems that are used for fermentation is not particularly limited. The leaves and the stems can be used as they are or can be cut by a crusher, a pulverizer, a grinder of a ball mill.

The cooling method after heating is not particularly limited and cooling can be conducted in the fermenting chamber with a ventilating fan or a cooler or can be conducted naturally.

The tea leaves and tea leave stems used for fermentation are moisturized with an atomizer and the water content is preferably adjusted to at least 30% by weight, more preferably 30 to 50% by weight. The water content after fermentation is preferably at most 20% by weight, more preferably 10 to 19% by weight. When the water content before fermentation is less than 30%, progression of fermentation tend to be insufficient. When the water content after fermentation is more than 20%, putrefaction tends to occur.

An amount of the tea leave stems when fermenting using tea leaves and tea leave stems is not particularly limited. Preferably, at least 5 parts by weight, more preferably at least 10 parts by weight, further preferably at least 25 parts by weight, particularly preferably 25 to 60 parts by weight, most preferably 27 to 40 parts by weight, of tea leave stems are co-present based on 100 parts by weight of tea leaves. When the amount of the tea leave stems is less than 5 parts by weight, ventilation when fermenting is poor, fermentation is nonuniform and the amount of the active ingredient produced from the tea leaves decreases, thus being unfavorable. When the amount is more than 60 parts by weight, fermenting the tea leaves tends to become difficult and the amount of the active ingredient tends to decrease.

In fermentation, a microorganism (mold) is preferably co-present, in order to sufficiently obtain the flavor and physiological activity specific to fermented tea. An example of the microorganism that is used is mold. The mold that is used can be present in nature and examples are molds of *Aspergillus* sp. including *Aspergillus awamori, Aspergillus saitoi, Aspergillus niger* and *Aspergillus orizae, Rhizopus* sp. including *Rhizopus delemar* and also, other molds for processing food such as tempeh mold. From the viewpoint of exhibiting physiological activity, mold of *Aspergillus* sp. and *Rhizopus* sp. are preferably used. The type of mold that is used can be one type or a mixture of several types, but pure fermentation using one type of mold is preferable.

Examples of the method of applying the mold to tea leaves and tea leave stems are the method of dry mixing tea leaves, tea leave stems and sporules of the mold as they are, the method of diluting the sporules of the mold by dry mixing together with a food diluent such as wheat flour, rice powder and barley flour and then mixing with tea leaves and tea leave stems, and the method of preparing a suspension of the sporules of mold in saline and then spraying onto the tea leaves and tea leave stems. The amount of mold is preferably 0.001 to 1% by weight, more preferably 0.01 to 0.5% by weight, based on the total amount of tea leaves and tea leave stems. When the amount of mold is less than 0.001% by weight, fermentation tends to be insufficient. When the amount of mold is more than 1% by weight, production costs tend to become too high.

These strains are easily available, as commercially available mold species such as koji for sake, koji for sweet sake, koji for shochu and koji for tempeh, and also, the fermented tea leaves can be left and reused as a mold starter.

Subsequently, the tea leaves and tea leave stems to which the mold is applied are spread on a bed in the fermenting chamber and then fermented. The temperature of the fermented substance when fermenting is preferably raised to 32° C. or higher, more preferably 32 to 45° C., further preferably 35 to 42° C., within 25 hours after beginning fermentation. When such conditions are not satisfied, that is the temperature is not raised to a high temperature in short period of time, progression of fermentation tends to be insufficient. This temperature is preferably maintained for at least 5 hours, more preferably 5 to 100 hours, further preferably 5 to 10 hours.

According to the process for preparing fermented tea of the present invention, tea leaves are fermented in a short period of time and so fermented tea can be prepared in 20 hours to 15 days, furthermore in about 10 hours to 7 days.

A content of caffeine in the fermented tea obtained by the process of the present invention is preferably at most 7% by weight, more preferably 3 to 5% by weight. When the content of caffeine is more than 7% by weight, the content of caffeine in the extract increases and physiological activity such as stimulant action and diuretic action tend to become strong.

The present invention also relates to a composition containing fermented tea extract and dietary fiber.

The fermented tea used in the composition of the present invention is not particularly limited, but tea fermented by microorganisms such as mold (for example *Aspergillus* sp. and *Rhizopus* sp.) that is aged over a long period, generally classified as "post-fermented tea", is preferably used. From the viewpoints of physiological activity such as cholesterol lowering activity, yield of the extract, which is the active ingredient, and also, reducing costs by shortening the preparation time of fermented tea, the above fermented tea obtained by the process comprising the step of fermenting tea leaves in the presence of tea leave stems is particularly favorable. Post-fermented tea is widely drunk in China and a small amount is also produced in Japan, for example in Toyama. For example, in hei-cha, besides "san-cha", which is in the usual form of tea leaves, there is "brick tea", which is prepared by piling up, post-fermenting and thereafter pressing the tea leaves. Examples of san-cha are Puer-cha and Liu bao-cha. Examples of brick tea are "hei juan-cha", "fu juan-cha", "kan juan-cha" and "fa juan-cha" according to the area of production.

The method for obtaining fermented tea extract, which is the active ingredient, from fermented tea is not particularly limited and the extract can be extracted by water, hot water or an organic solvent (such as ethanol and methanol). Particularly, from the viewpoint of safety, water or hot water is preferably used. The amount of water or hot water that is used is preferably 100 to 10,000 parts by weight, more preferably 150 to 9,000 parts by weight, further preferably 200 to 5,000 parts by weight, based on 100 parts by weight of the fermented tea. When the amount of water or hot water is less than 100 parts by weight, sufficient extraction tend to be difficult. When the amount is more than 10,000 parts by weight, solid-liquid separation after extraction tends to become complicated. Extraction is conducted by charging an extraction tank with water or hot water and fermented tea and then heating, if necessary, stirring. The extraction time is not particularly limited, but is preferably 0.1 to 5 hours, more preferably 0.2 to 4 hours. When the extraction time is less than 0.1 hour, extraction is insufficient and the rate of recovery tends to become low. When the extraction time is more than 5 hours, operational efficiency tends to become poor. The method of directly spraying steam on the fermented tea leaves in a pressure vessel in order to promote extraction efficiency and the method of heating a jacket attached around the pressure vessel and increasing the temperature utilizing the propagation heat can be employed.

The method for obtaining the extract from the obtained extraction solution is not particularly limited. When necessary, acid treatment, alkali treatment or membrane treatment, typically solid-liquid separation treatment by centrifugation etc. is conducted and thereafter, impurities are removed by a filter press. The extract can be used in a concentrated form or the concentrated substance can further be dried. The concentration method is not particularly limited, but vacuum concentration, membrane concentration and freezing concentration can be employed. As the drying method, spray drying, freeze drying and drying using machines such as a kneader or a nauter mixer can be employed. The concentrated solution or dried powder can be used for functional foods by itself or added into other foods.

The composition of the present invention is obtained by mixing dietary fiber with the fermented tea extract. The dietary fiber used in the present invention can be water-soluble or water-insoluble and a preferable example is polysaccharide. Examples of polysaccharides are dextrin, cellulose, starch and gum, which are usually used in food processing; chitin, chitosan, fucoidin, agar and polydextrose, which are derived from marine products and pullulan and curdlan, which are derived from microorganisms. Of these, dextrin, cellulose and starch are preferable in view of food processability.

The content of dietary fiber in the composition of the present invention is preferably 5 to 500 parts by weight, more preferably 10 to 450 parts by weight, further preferably 15 to 400 parts by weight, based on 100 parts by weight of the fermented tea extract. When the content of dietary fiber is less than 5 parts by weight, the composition may taste bitter and when the content is more than 500 parts by weight, a large amount must be ingested in order to obtain the physiological activity of fermented tea. Also, because absorption is inhibited by the dietary fiber, physiological activity tends to decrease.

When mixing the fermented tea extract and dietary fiber the dietary fiber can be mixed with the fermented tea extract and then concentrated and dried or the fermented tea extract can be made into powder and then mixed with the dietary fiber.

The composition of the present invention is excellent in physiological activity such as cholesterol lowering activity and blood glucose-increase inhibiting activity and therefore, is useful as functional foods by itself or added into other foods. This is described in detail below.

In the case that the composition of the present invention itself is the functional food, the composition is directly granulated or processed into tablets. Specific examples of the foods in which the composition is added when used in other foods are given below, but not limited thereto.

(1) Processed Agricultural and Marine Products
starch noodles, pureed sweet bean paste, devil's tongue, bread, noodles (instant noodles, pasta, raw noodles, dry noodles), rice cakes, cereals, processed soybean products (tofu, soy milk, natto, frozen tofu), processed marine products [fish paste products, (crab flavor) kamaboko fish cakes, (fish) ham, (fish) sausage, (fish) wieners, furikake (seasoning for rice), seaweed for ochazuke (rice with hot tea)], foods containing egg (soups and rice bowls), canned foods (oil-preserved sardines, yakitori), retort foods (curry, stew, spaghetti)

(2) Dairy Products
milk, processed milk, lactobacillary beverages, butter, cheese, condensed milk, powdered milk (3) Confectioneries
cakes, mousses, (powdered) desserts, ice cream, candy, chocolate, gumdrops, cookies, wafers, jellies (4) Seasonings
miso, soy sauce, flavor-enhancing seasonings, (powdered) natural seasonings, sauces, dressings, barbecue sauces, sweet sake, curry, stew, spices, yogurt (5) Drinks
soft drinks (carbonated beverages, fruit juices, sports drinks, energy drinks), luxury drinks (coffee, cocoa, wort)

(6) Health Foods (Nutritional Supplementary Foods)
<1> Saponin-containing foods (foods containing ginseng root, foods containing Siberian ginseng)
<2> Saccharide-containing foods [oligo saccharide (foods containing fructooligo saccharide, foods containing isomaltoligo saccharide, foods containing galactooligo saccharide), polysaccharide (foods containing shiitake mushrooms, mucosacchrides, foods containing protein, foods containing chondroitin sulfate, foods containing *Ganoderma Lucidum* (Reishi)), foods containing chitin/chitosan]
<3> Mineral-containing foods
foods containing calcium, foods containing alfalfa, foods containing prune extract, foods containing β-carotene
<4> Fat-containing foods
fat containing vitamin E [barley (wheat and tear grass) germ oil, soybean germ oil, rice germ oil], foods containing eicosapentaenoic acid, foods containing soybean lecithin, foods containing γ-linoleic acid (evening primrose oil, borage oil), foods containing docosahexaenoic acid
<5> Protein-containing foods
foods containing soyben protein, casein, whey protein, processed carp foods
<6> Taurine
processed oyster foods, processed freshwater clam foods
<7> Others
processed snapping turtle foods, foods for amino acid dybolism, liquid diet (food for patients)

Hereinafter, the present invention is described in detail based on Examples.

In Examples, "part(s)" and "%" represent weight standards unless indicated otherwise.

EXAMPLE 1

Tea leaves and tea leave stems of the Chinese big leaf species were harvested. A directly fired iron pot was charged with 100 parts by of the tea leaves and 37 parts of the tea leave stems and the leaves and stems were roasted in the iron pot at 90° C. for 25 minutes. After cooling, water was sprayed using an atomizer to adjust the water content to 32%. Then, the contents were placed in a fermenting chamber and the mold of *Aspergillus* sp. was added in an amount of 0.1% based on the total amount of the tea leaves and tea leave stems. The contents were thoroughly mixed. After the temperature in the system was raised to 37° C. over 25 hours, fermentation was continued at this temperature for 80 hours to obtain fermented tea. The caffeine content of the obtained fermented tea was 4.8% by weight.

The preparation time, yield of the extract and physiological activity of the fermented tea prepared according to the above method were evaluated by the following criteria.

(Yield)

198 g of the obtained fermented tea leaves were placed in an extraction tank and 1000 mL of water was added thereto. Extraction was conducted for 1 hour at 120° C. and 1150 mL of extraction fluid was obtained. After centrifuging the extraction fluid, impurities were removed by a filter press. The obtained extraction fluid was concentrated and then freeze dried and yield of the extract obtained thereby was found. Yield was calculated by the following equation.

Yield(%)=weight of dry powder(g)/weight of fermented tea leaves(g)×100

(Physiological Activity)

11 hypercholesterolemic volunteers (average total cholesterol value: 231 mg/dL) were subjected to a test in the following manner based on informed consent.

The volunteers abstained from eating and drinking after 8 p.m. the day before the test and after talking with the physician, a single oral administration test was conducted. The control ingested 30 g of butter and 6 hours after ingestion, a blood sample was obtained and the cholesterol value was measured. In the test, the volunteers ingested 1 to 5 g of the dried extract together with the butter. 6 hours after ingestion, blood samples were obtained and the cholesterol values were measured. The rate of suppression (%) from the cholesterol value of control was evaluated.

EXAMPLE 2

Fermented tea was obtained in the same manner as in Example 1, except that the content of tea leave stems was 55 parts. The content of caffeine in the obtained fermented tea was 4.3%. Also, yield and physiological activity were evaluated in the same manner as in Example 1.

EXAMPLE 3

Fermented tea was obtained in the same manner as in Example 1, except that the content of tea leave stems was 30 parts. The content of caffeine in the obtained fermented tea was 4.7%. Also, yield and physiological activity were evaluated in the same manner as in Example 1.

EXAMPLE 4

Fermented tea was obtained in the same manner as in Example 1, except that *Rhizopus* sp. was used as the mold. The content of caffeine in the obtained fermented tea was 4.5%. Also, yield and physiological activity were evaluated in the same manner as in Example 1.

EXAMPLE 5

Fermented tea was obtained in the same manner as in Example 1, except that the amount of mold was 1.0% based on the total amount of tea leaves and tea leave stems. The content of caffeine in the obtained fermented tea was 4.5%. Also, yield and physiological activity were evaluated in the same manner as in Example 1.

EXAMPLE 6

Fermented tea was obtained in the same manner as in Example 1, except that the temperature was raised to 45° C. when fermenting. The content of caffeine in the obtained fermented tea was 4.5%. Also, yield and physiological activity were evaluated in the same manner as in Example 1.

EXAMPLE 7

Fermented tea was obtained in the same manner as in Example 1, except that the amount of tea leave stems was 2 parts. The content of caffeine in the obtained fermented tea was 5.1%. Also, yield and physiological activity were evaluated in the same manner as in Example 1.

The evaluation results of Examples 1 to 7 are shown in Table 1.

TABLE 1

|  | Preparation time (hr.) | Yield of extract (%) | Physiological activity (%) |
| --- | --- | --- | --- |
| Ex. 1 | 80 | 30 | 50 |
| Ex. 2 | 76 | 27 | 45 |
| Ex. 3 | 85 | 33 | 53 |
| Ex. 4 | 82 | 30 | 51 |
| Ex. 5 | 76 | 29 | 50 |
| Ex. 6 | 86 | 31 | 50 |
| Ex. 7 | 130 | 20 | 15 |

EXAMPLE 8

198 g of brick tea was placed in an extraction tank and 1000 mL of water was added thereto. Extraction was conducted for 1 hour at 120° C. and 1150 mL of extraction fluid was obtained. After centrifuging the extraction fluid, impurities were removed by a filter press. The fluid was concentrated and 120 mL of a 20% solution (extract) was obtained. Subsequently, the solution (24 g of extract) was mixed with 40 g of water-soluble dextrin as dietary fiber and spray dried to obtain 56 g of a dried substance (composition of the present invention). Evaluation of flavor and stability of the obtained dried substance was conducted in the following manner.

[Evaluation of Flavor]

The obtained dried substance was dissolved in hot water (80° C.) to prepare a 1% solution and bitterness, smell and ingestibility were evaluated in the following manner.

(Bitterness)
○: no bitterness
Δ: some bitterness
x: bitter
(Smell)
○: no smell
Δ: some smell
x: smells
(Ingestibility)

The flavor characteristic to hei-cha (usually moldy smell, bitter aftertaste, distinctive unpleasantness to the tongue) were evaluated from an overall viewpoint and ingestibility was evaluated in the following manner.
○: easily ingested
Δ: somewhat difficult to ingest
x: difficult to ingest

[Evaluation of Stability]

1 g of the obtained dried substance was placed in a schale having a diameter of 10 cm. Then, the schale was placed in a thermostat box of a temperature of 45° C. and humidity of 70% and the condition of the powder was observed over time. Evaluation was conducted as described below.

(State of Powder)
○: same as before beginning the test
Δ: only the surface of the powder is sticky
x: powder has absorbed moisture and is sticky
(Change in Viable Cell Count)

The cells were counted by the standard agar culture method.

EXAMPLE 9

The dried substance was obtained in the same manner as in Example 8, except that cellulose was used instead of water-soluble dextrin. The obtained dried substance was evaluated in the same manner as in Example 8.

EXAMPLE 10

The dried substance was obtained in the same manner as in Example 8, except that starch was used instead of water-soluble dextrin. The obtained dried substance was evaluated in the same manner as in Example 8.

EXAMPLE 11

The dried substance was obtained in the same manner as in Example 8, except that 24 g of water-soluble dextrin was used. The obtained dried substance was evaluated in the same manner as in Example 8.

Comparative Example 1

The dried substance was obtained in the same manner as in Example 8, except that water-soluble dextrin was not used. The obtained dried substance was evaluated in the same manner as in Example 8.

The evaluation results of Examples 8 to 11 and Comparative Example 1 are shown in Tables 2 to 4.

TABLE 2

| | Evaluation of taste | | |
|---|---|---|---|
| | Bitterness | Smell | Ingestibility |
| Ex. 8 | ○ | ○ | ○ |
| Ex. 9 | ○ | ○ | ○ |
| Ex. 10 | ○ | ○ | ○ |
| Ex. 11 | ○ | ○ | ○ |
| Com. Ex. 1 | X | X | X |

TABLE 3

| | State of powder | | | |
|---|---|---|---|---|
| | Storage time (days) | | | |
| | 1 | 2 | 3 | 7 |
| Ex. 8 | ○ | ○ | ○ | ○ |
| Ex. 9 | ○ | ○ | ○ | ○ |
| Ex. 10 | ○ | ○ | ○ | ○ |
| Ex. 11 | ○ | ○ | ○ | ○ |
| Com. Ex. 1 | X | X | X | X |

TABLE 4

| | Change in viable cell count | | | |
|---|---|---|---|---|
| | Storage time (days) | | | |
| | 1 | 2 | 3 | 7 |
| Ex. 8 | 10 | 10 | 10 | 100 |
| Ex. 9 | 10 | 10 | 30 | 500 |
| Ex. 10 | 10 | 13 | 45 | 1,500 |
| Ex. 11 | 10 | 20 | 500 | 1,000 |
| Com. Ex. 1 | 3,000 | 5,000 | $10^6$ | $10^8$ |

Usually, the viable cell count must be at most 3,000 when applying to food.

According to the process for preparing fermented tea of the present invention, the time for preparing fermented tea can be shortened, while maintaining physiological activity of fermented tea such as cholesterol lowering activity, and yield of the extract from fermented tea can be improved.

Also, the composition of the present invention comprising fermented tea and dietary fiber can prevent putrefaction and degeneration due to bacteria in storage and has improved flavor and excellent stability. Therefore, the composition of the present invention is useful as functional foods, utilizing physiological activity specific to hei-cha extract such as cholesterol lowering activity and blood glucose-increase inhibiting activity, and can be used alone or as an additive to various foods.

What is claimed is:

1. A process for preparing Pu-erh tea, comprising:
applying *Aspergillus niger* to tea leaves in the presence of tea leave stems to produce a fermentation mixture,
adjusting water content of the fermentation mixture to 30 to 50% by weight,
spreading the fermentation mixture on a bed in a fermenting chamber,
increasing the temperature of the fermenting chamber to at least 32° C. within 25 hours, and
fermenting said tea leaves in the presence of said tea leave stems, wherein the amount of said tea leave stem is 25 to 34.9 parts by weight based on 100 parts by weight of said tea leaves,
wherein the fermenting is conducted in the presence of *Aspergillus niger* for 76 to 86 hours at a temperature of 32 to 45° C., and
wherein the amount of the *Aspergillus niger* is 0.001 to 1% by weight based on the total amount of the tea leaves and tea leave stems.

2. A Pu-erh tea obtained by the process of claim 1.

3. The Pu-erh tea of claim 2, wherein the content of caffeine is at most 7% by weight.

4. A composition containing fermented tea extract and dietary fiber, wherein said fermented tea is the Pu-erh tea of claim 2.

5. The composition of claim 4, wherein said fermented tea extract is obtained by extracting Pu-erh tea by water or hot water.

6. The composition of claim 4, wherein said dietary fiber is a polysaccharide.

7. The composition of claim 4, wherein the amount of said dietary fiber is 5 to 500 parts by weight based on 100 parts by weight of said fermented tea extract.

8. A functional food containing the composition of claim 4.

* * * * *